No. 861,833. PATENTED JULY 30, 1907.
D. HALLORAN.
LOW LIFT PLOW.
APPLICATION FILED DEC. 18, 1906.
3 SHEETS—SHEET 2.
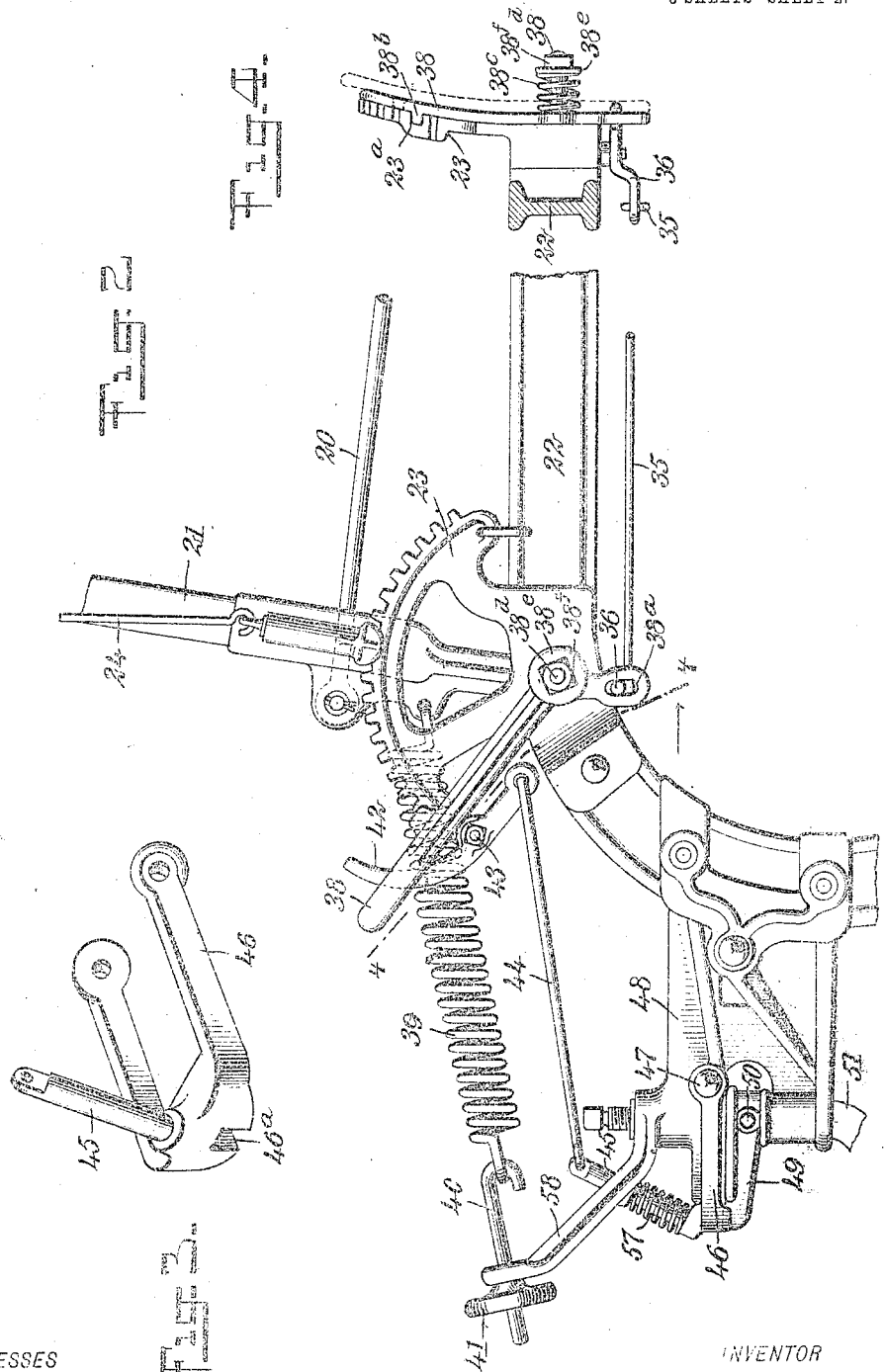
WITNESSES
INVENTOR
Dennis Halloran
BY Munn & Co
ATTORNEYS

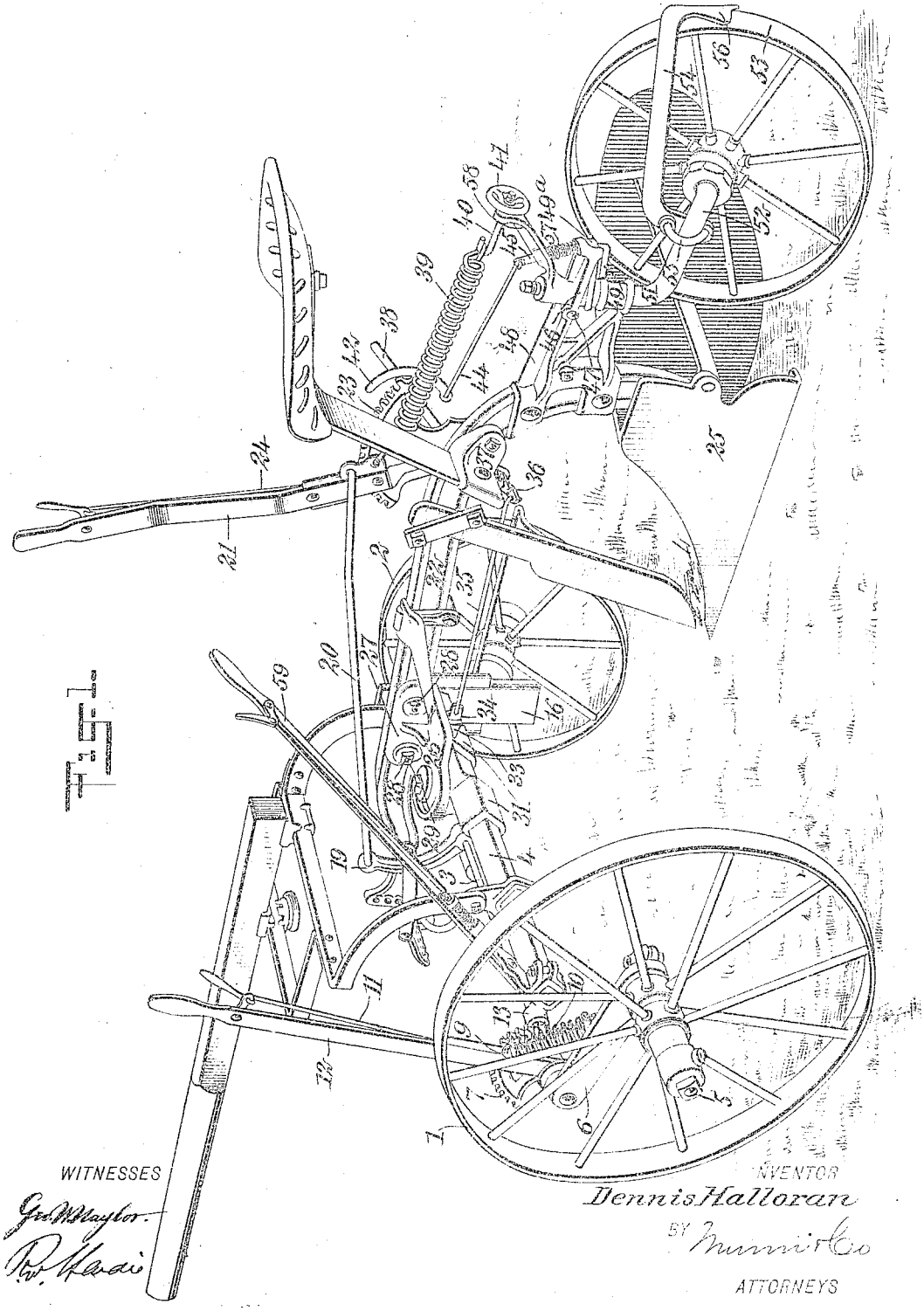

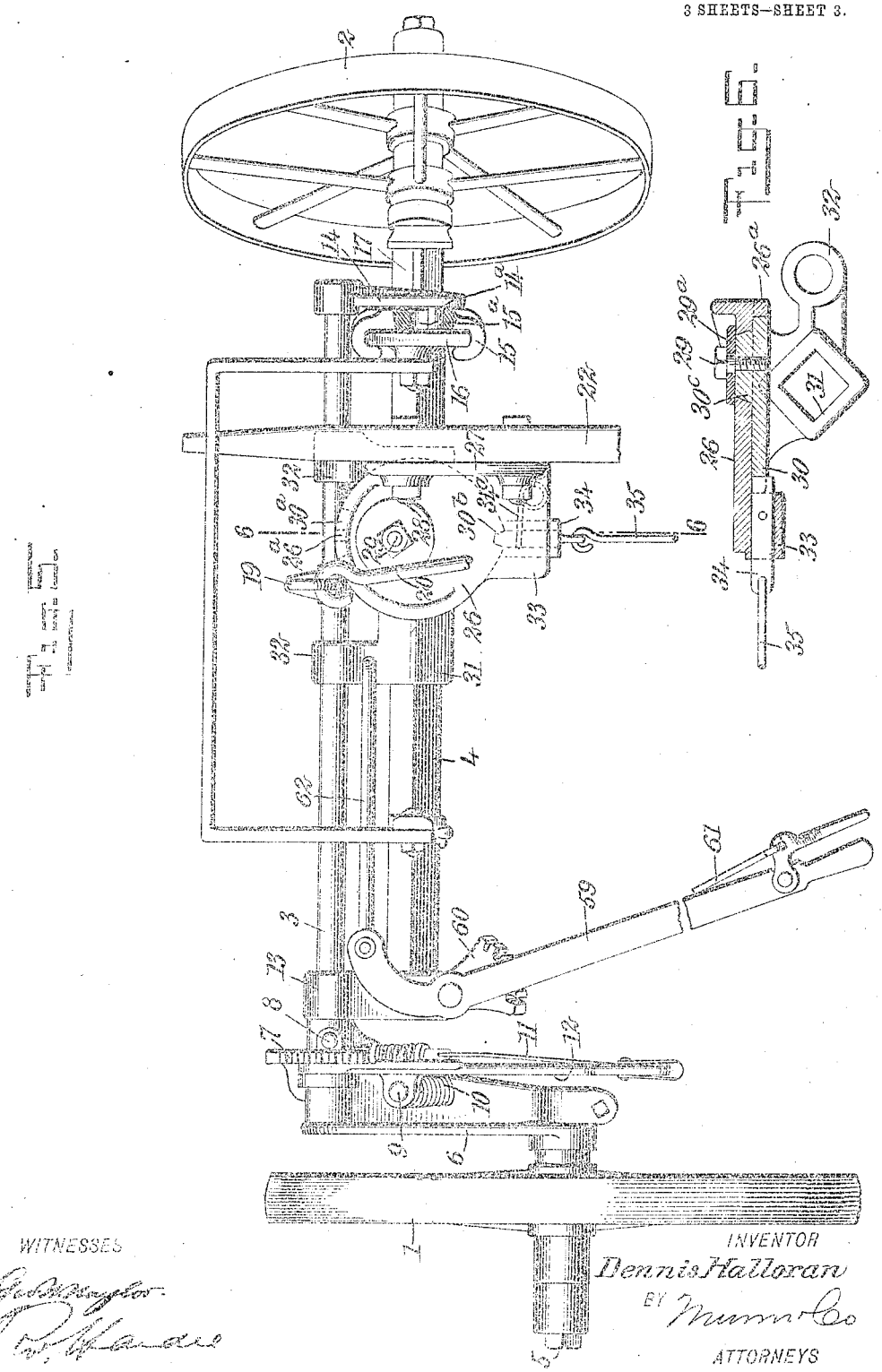

UNITED STATES PATENT OFFICE.

DENNIS HALLORAN, OF PARIS STATION, ONTARIO, CANADA.

LOW-LIFT PLOW.

No. 861,833.　　　　Specification of Letters Patent.　　　　Patented July 30, 1907.

Application filed December 18, 1906. Serial No. 348,392.

*To all whom it may concern:*

Be it known that I, DENNIS HALLORAN, a subject of the King of Great Britain, and a resident of Paris Station, Province of Ontario, and Dominion of Canada, have invented a new and Improved Low-Lift Plow, of which the following is a full, clear, and exact description.

This invention relates to low lift plows, and has for its object to provide means adapted to enable the plow to make a short turn; to permit the plow to be readily adjusted so as to regulate the depth of cut, to regulate the width of cut of the furrow; to enable the plow to be readily lifted out of the ground or placed therein; to enable the rear furrow wheel to be locked in position or allowed to run free at will, and to provide means whereby the rear furrow wheel and pivotal connection of the plow with the main frame may be operated by the main lever of the plow.

Other objects relating to the specific construction and special arrangement of the several parts of my invention will be understood by the following description and accompanying drawings, in which drawings like characters of reference indicate like parts throughout the views, and in which Figure 1 is a perspective view of a plow embodying my invention; Fig. 2 is a side elevation of the upper rear portion of the plow beam with adjusting mechanism connected therewith; Fig. 3 is a perspective view of a yoke adapted to lock the standard of the rear furrow wheel; Fig. 4 is an end view of an adjusting lever attached to the plow beam, shown in cross section, with an auxiliary lever connected therewith, taken on the line 4—4 of Fig. 2; Fig. 5 is a plan of the main frame of the plow shown in Fig. 1; and Fig. 6 is a vertical transverse section taken on the line 6—6 of Fig. 5.

As illustrated in the drawings, the plow beam is pivotally connected with a transverse frame, which is mounted upon a land wheel 1 and furrow wheel 2, having axles 3 and 4 connected with said wheels respectively. The land wheel 1 is mounted upon a spindle 5 fixedly attached to an arm 6, which arm is journaled upon the axle 3 in any suitable manner. A notched segment 7 is fixedly secured to the axle 3 by means of a set screw 8 or otherwise. A lever 12 is also journaled upon the axle 3, and is connected with the axle arm 6 by means of a bolt 9 extending through a spiral spring 10, as shown in Figs. 1 and 5. By means of such construction the arm 6 is rocked on the axle 3, as may be desired, so as to regulate the depth of the furrow to be cut. The lever 12 is locked in engagement with the segment 7, and consequently with the axle 3, by means of a spring-actuated latch 11 provided with a grip arranged in convenient relation with the upper end or handle of the lever 12. The axle 3 is journaled at one end in an arm 13 fixedly secured to the end of the axle 4, as shown in Fig. 5, the axle 4 being preferably made angular in cross section. The other end of the axle 3 is provided with a lever 14 fixedly secured thereto; the end of the lever being provided with a pin $14^a$ engaging a horizontal slot $15^a$ formed in a bracket 15, which has a sliding engagement with a plate 16 fixedly attached to the angular axle 4. An arm 19 is also fixedly secured to the axle 3, and is connected by means of a rod 20 with an operating lever 21 pivotally mounted upon the plow beam 22. A notched segment 23 is also attached to the plow beam 22, and coöperates with a spring actuated latch 24 of ordinary construction to hold the lever 21 in a set position on the plow beam.

A stub axle 17 is attached to the bracket 15 and has its bearing in the furrow wheel 2. This furrow wheel is staggered so as to permit the rim of the wheel to run in the angle of the furrow where the ground is hard, and relieve the rim from rubbing against the edge of the furrow and also to prevent any tendency of the wheel to climb, owing to the team walking unevenly. By means of such construction the lever 21, when moved backward or forward, rocks the axle 3, which is fulcrumed in the bracket 15, by means of the crank pin $14^a$ engaging the slot $15^a$ of the bracket 15, and thereby raises or lowers the axle 3 and also the angular axle 4 which is connected with the axle 3 by means of the arm 13, and also by means of a traveling head mounted upon said axles and consisting of socket heads 31 and 32 having bearing for the fixed and rocking axles respectively.

A turn table is mounted upon the traveling head and is adapted to support the plow beam so as to enable the plow beam to be raised and lowered with the axles and thereby move the plow 25 in and out of the ground when desired, and enable the plow beam to be moved lengthwise of the axles so as to adjust the width of furrow and also permit a pivotal movement of the plow beam on said head. The turn table consists of a bearing plate 26, having a vertical flange 27 which is fixedly secured to the plow beam 22 by means of bolts 28. The bearing plate is preferably provided with a central aperture engaging a hub $30^c$ formed on a base plate 30 mounted upon a head of any suitable construction adapted to slide on the axles 3 and 4. A bolt 29 and washer $29^a$ clamp the bearing plate and base plate of the turn table together.

The bearing plate 26 is provided with a lip $26^a$ adapted to move in an arc-recess $30^a$ formed in the base plate 30, so as to limit the movement of the bearing plate 26 on the base plate 30.

The base plate 30 is provided with a rearward extension 33 having a bearing for a latch bolt 34 adapted to engage at its forward end with a notch $30^b$ formed in the plate 30, as illustrated by dotted lines in Fig. 5. The latch 34 is held in the notch of the base plate 30 by means of a spring $34^a$ secured to the extension of the plate 30. A connecting rod 35 extends from the latch 34 to a pivoted lever 36 mounted upon the plow beam 22 or the seat bracket 37 connected therewith. A lever 38 is provided on its lower end with a slot 38$^a$, which engages one end of the lever 36 so as to move the latch 34 into or out of engagement with the notch 30$^b$ in the bearing plate 30. The lever 38 is also provided with a lug 38$^b$ adapted to engage a recess 23$^a$ formed in the notched segment 23.

A lifting spring 39 is attached to the main operating lever 21, and is connected at one end with a tensioning device, consisting of a bolt 40 having a hand wheel 41 connected therewith. An auxiliary lever 42 is pivotally attached at 43 to the segment 23, the upper end of the lever being curved and extended in the direction and in the path of travel of the main operating lever 21. The lower end of the lever 42 is connected by means of a rod 44 pivotally attached thereto, with an arm 45 of a yoke 46, which yoke is pivotally attached by means of bolts 47 to a bracket 48 secured to the rear portion of the plow beam 22. The yoke 46 is provided with a notch 46$^a$ which engages a corresponding projection 49$^a$ formed on a bracket 49, which is fixedly secured by means of a set screw 50 to a standard 51 formed integral with an axle 52 upon which is mounted a rear furrow wheel 53. A scraper 54 is preferably attached to the axle 52 by means of a clamp 55 or otherwise, and is provided with a scraping end 56 adapted to bear against the rim of the rear furrow wheel 53. The yoke 46 is held in engagement with the arm 49 of the standard 51 by means of a spring 57, which bears against said yoke and against an arm 58 formed on the bracket 48. A lever 59 is pivotally connected with the angular axle 4 and with a notched segment 60 adapted to engage a spring latch 61 so as to lock said lever in position relatively to said segment, and is provided with a link 62 pivotally attached to the end of said lever and to the head supporting the plow beam on the axles 3 and 4, so as to slide the head on the axles and set the plow to cut a furrow of the desired width.

When the device is in use, the plow is set to cut at the desired depth by means of the lever 12, which, being freely mounted upon the axle 3, carries with it the axle arm 6 and the bolt 9, and adjusts the elevation of the axles so as to hold the plow beam at the desired elevation to produce the depth of cut required. In addition to serving as a means for connecting the lever 12 to the axle arm 6, the bolt 9 and spring 10 serve to cushion the land wheel 1, so as to compensate for any inequalities in the ground caused by dead furrows, stones or depressions of any nature.

The width of the furrow is determined, as already described, by adjusting the lever 59, so as to slide the head supporting the plow beam and turn table longitudinally of said axles, thereby adjusting and securing the plow in a position to turn a furrow of the desired width. The plow is raised bodily out of the ground or placed therein by operating the lever 21. Thus, said lever, when moved backward, carries with it the upper end of the arm 19 secured to the round axle 3, thereby rocking said axle and raising the axles 3 and 4 and the head supporting the turn table, consequently lifting the plow out of the ground. A reverse movement of the lever 21 places the plow into the ground. On moving the lever 21 backward to raise the plow from the ground, the lever 21 bears against the curved end of the pivoted lever 42 and releases the yoke 46 from engagement with the arm 49 and permits the arm 51 on the bent axle 52 to rotate freely in its bearings. When the lever 21 is released from engagement with the lever 42, however, the spring 57 holds the yoke 46 in constant engagement with the bracket 49 attached to the upright arm 51 of the bent axle 52, and locks said arm on the bracket 48 attached to the plow beam.

In its normal position, the latch 34 is released from engagement with the notch 30$^b$ of the bearing plate 30, and is held in such position by means of the lug 38$^b$ of the lever 38 engaging the recess 23$^a$ in the notched segment 23. A spring 38$^f$ is mounted upon a bolt 38$^d$, so as to bear against the lever 38, and is held in place by a washer 38$^e$ and nut 38$^b$ so as to hold said lever in engagement with the notch in said segment. This lever is released only when the front wheels are to be locked relatively to the plow beam for finishing a land or making the last furrow, in which case the spring 34$^a$ holds the latch 34 in engagement with the notch 30$^b$ of the base plate 30 of the sliding head.

In the construction herein shown and described, I have embodied my invention in its preferred form. I do not desire to be limited to such construction, however, as other means having similar capabilities may be used without departing from my invention. Thus while the axle 4 is preferably made angular in cross section so as to be non-rotatably connected with the bearings 31 of the sliding head, a round shaft may be used instead and provided with any of the well known means for holding the axle and head against rotary motion relatively to each other. While but a single plow is used in the construction shown, it is obvious that a double plow may be used, if desired, and operated in substantially the same manner. When so used the plow beams may be connected together by means of a transverse bar 64 attached to said plow beams in any suitable manner. In the drawings, said bar is shown partly broken away and attached at one end to the beam 22.

Having thus described my invention, what I claim as new and desire to secure by Letters Patent is:

1. In a sulky plow, the combination with a transverse frame provided with bearings for land and furrow wheels, and comprising oppositely disposed parallel axles, of a head slidingly mounted on said axles and provided with a base plate, a turn table pivotally mounted on said base plate, a plow beam attached to said turn table, a lever pivotally mounted on said transverse frame, and a rod connecting said lever and sliding head.

2. In a sulky plow, the combination with a transverse frame provided with land and furrow wheels, of a head slidable longitudinally on said frame, a plate pivotally connected with said head, a plow beam secured to said plate, a rear furrow wheel, a connection between said rear furrow wheel and pivoted plate, a lever mounted on the transverse frame, and a connection between said lever and head for sliding said head on the transverse frame.

3. In a sulky plow, the combination with a transverse frame comprising parallel axles provided with bearings for a land wheel and a furrow wheel respectively, a head adapted to slide longitudinally of said axles, a turn table pivotally mounted on said head, and means for raising and lowering said axle relatively to said wheels.

4. In a sulky plow, the combination of a transverse frame comprising parallel axles provided with bearings for a land and a furrow wheel respectively, a head adapted to slide longitudinally of said frame, a turn table mounted on said head, and a spring actuated latch adapted to lock said turn table on said head.

5. In a sulky plow, the combination of a transverse frame comprising parallel axles, an arm journaled on one axle and provided with a bearing for a land wheel, a bracket having a sliding connection with the other axle and provided with a bearing for a furrow wheel, a lever connecting the first axle with said bracket, a head having a sliding engagement with said axles, a turn table pivotally mounted on said head, a plow beam secured to said turn table, a lever mounted on said plow beam, and connecting mechanism adapting said axles to be raised by a movement of said lever.

6. In a sulky plow, the combination with a transverse frame having parallel axles provided with bearings for a land wheel and a furrow wheel, a head adapted to travel on said axles, a turn table mounted on said head, a plow beam secured to said turn table, a plow secured to said beam, a main lever mounted on said plow beam, a furrow wheel journaled on a bracket secured to the rear portion of said plow beam, a spring actuated yoke adapted to lock said wheel in position, and mechanism connected with said main lever adapted to release said rear furrow wheel when the plow is raised from the ground.

7. In a sulky plow, the combination of a transverse frame having parallel axles provided with bearings for a land wheel and a furrow wheel respectively, a head mounted to slide on said axles, a turn table adapted to rotate on said head, a plow beam secured to said turn table, a main lever pivoted to said plow beam, a notched segment connected with said lever, a latch adapted to lock said turn table against rotary motion, and a spring actuated lever adapted to control said latch.

8. In a plow, the combination with a plow beam, of a plow secured to said beam, a furrow wheel arranged behind said plow and mounted upon a bent axle, a bracket secured to said plow beam provided with a bearing adapted to receive the upper end of said axle, an arm fixedly secured to said axle, a yoke adapted to engage said arm, a spring adapted to hold said yoke in engagement with said arm, a main lever pivoted on the plow beam, and an auxiliary lever adapted to be operated by the main lever and release said yoke from engagement with said arm.

9. In a sulky plow, the combination of a non-rotatable axle, arms extending laterally from said axle and provided with bearings, a rocking axle journaled in said bearings and arranged laterally of the first named axle, an arm journaled on the rocking axle and provided with a spindle for a land wheel, a lever journaled on the rocking axle, a notched segment fixedly attached to the rocking axle, and a rod connecting said lever and arm.

10. In a sulky plow, the combination of a non-rotatable axle having arms extending laterally therefrom and provided with bearings, a rocking axle journaled in said bearings arranged laterally of the first named axle, an arm journaled on one end of the rocking axle and provided with a spindle for a land wheel, a lever journaled on said rocking axle, a notched segment fixedly attached to said axle, a spring arranged between said arm and lever, and a bolt within said spring connecting said lever and arm.

11. In a sulky plow, the combination with a non-rotatable axle having arms extending laterally therefrom, and provided with bearings, of a rocking axle journaled in said bearings and arranged laterally of the first named axle, a guide plate fixedly attached to the non-rotatable axle, a bracket having a sliding engagement with said plate and provided with a spindle for a furrow wheel, and a lever attached to one end of the rocking axle with its free end fulcrumed in said bracket.

12. In a sulky plow, the combination of a non-rotatable axle having a bearing for a furrow wheel, an arm extending laterally from said axle and provided with a bearing, a rocking axle journaled in said bearing arranged laterally of the first named axle and provided with a bearing for a land wheel, a head slidingly mounted on said axle and provided with laterally extending arms having bearings for the rocking axle, and a beam plate pivotally mounted on said head.

13. In a sulky plow, the combination with a non-rotatable axle having a laterally extending arm provided with a bearing, of an axle adapted to rock in said bearing and arranged laterally of the first named axle, a head freely mounted on said axles and provided with bearings therefor, a spindle for a land wheel connected with the rocking axle, a spindle for a furrow wheel connected with the non-rotatable axle, a plow beam pivotally mounted on said head, a rear furrow wheel connected with said plow beam, and means for locking and unlocking said rear furrow wheel relatively to the plow beam.

14. In a sulky plow, the combination of a non-rotatable axle having a bearing for a furrow wheel, a rocking axle arranged laterally of the first named axle and provided with a bearing for a land wheel, a head slidingly mounted on the first named axle and provided with bearings for the rocking axle, and a beam plate pivotally mounted on said head.

In testimony whereof I have signed my name to this specification in the presence of two subscribing witnesses.

DENNIS HALLORAN.

Witnesses:
JOHN NEWTON,
JOHN DUNCAN.